US010877870B2

(12) United States Patent
Chimdyalwar et al.

(10) Patent No.: US 10,877,870 B2
(45) Date of Patent: Dec. 29, 2020

(54) METHOD AND SYSTEM FOR VERIFYING PROPERTIES OF SOURCE CODE

(71) Applicant: Tata Consultancy Services Limited, Mumbai (IN)

(72) Inventors: Bharti Dewrao Chimdyalwar, Pune (IN); Priyanka Dilip Darke, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 16/436,791

(22) Filed: Jun. 10, 2019

(65) Prior Publication Data

US 2019/0377658 A1  Dec. 12, 2019

(30) Foreign Application Priority Data

Jun. 11, 2018 (IN) .............................. 201821021741

(51) Int. Cl.
*G06F 9/44* (2018.01)
*G06F 11/36* (2006.01)

(52) U.S. Cl.
CPC ................................ *G06F 11/3608* (2013.01)

(58) Field of Classification Search
CPC ........................................ G06F 11/3604–3616
USPC ........................................................ 717/126
See application file for complete search history.

(56) References Cited

U.S. PATENT DOCUMENTS

| 6,029,002 | A  | * | 2/2000  | Afifi    | G06F 8/433   |
|           |    |   |         |          | 714/E11.209  |
| 6,301,700 | B1 | * | 10/2001 | Choi     | G06F 9/4492  |
|           |    |   |         |          | 717/116      |
| 6,971,084 | B2 | * | 11/2005 | Grey     | G06F 9/52    |
|           |    |   |         |          | 717/106      |
| 7,174,536 | B1 | * | 2/2007  | Kothari  | G06F 11/3664 |
|           |    |   |         |          | 717/105      |

(Continued)

OTHER PUBLICATIONS

Bharti Chimdyalwar et al.; "Statically Relating Program Properties for Efficient Verification (Short WIP Paper)"; LCTES'18, Jun. 19-20, 2018, Philadelphia, PA, USA 2018 Association for Computing Machinery. ACM ISBN 978-1-4503-5803-3/18/06.*

(Continued)

*Primary Examiner* — Francisco J Aponte
(74) *Attorney, Agent, or Firm* — Finnegan, Henderson, Farabow, Garrett & Dunner, L.L.P.

(57) ABSTRACT

This disclosure relates generally to method and system for verifying properties of source code. Verifying sufficient subset of properties by identifying implication relations between their verification outcomes is time consuming because of increased size of source code with large number of properties. The proposed disclosure processes the received source code for verifying properties by analyzing the source code to merge the plurality of properties into a plurality of groups based on a grouping technique. Then, slice for each group among the plurality of groups are created. Further, each slice created for each group is verified; verification for the one or more properties within each group (Continued)

is performed simultaneously. The system groups the properties thereby providing efficient and scalable system for verifying properties which reduces cost with increased efficiency and improved performance.

12 Claims, 6 Drawing Sheets

(56) References Cited

U.S. PATENT DOCUMENTS

| | | | | |
|---|---|---|---|---|
| 7,257,804 | B2* | 8/2007 | Baecker | G06F 8/20 717/124 |
| 7,620,946 | B2* | 11/2009 | Russell | G06F 30/30 717/157 |
| 7,949,511 | B2* | 5/2011 | Ganai | G06F 11/3608 703/22 |
| 8,443,343 | B2* | 5/2013 | Blomstedt | G06F 8/433 717/136 |
| 8,448,139 | B2* | 5/2013 | Ghosh | G06F 11/3636 717/124 |
| 8,612,954 | B2* | 12/2013 | Abadi | G06F 8/433 717/155 |
| 8,856,726 | B2 | 10/2014 | Conrad et al. | |
| 8,959,478 | B2* | 2/2015 | Abadi | G06F 11/3612 717/106 |
| 9,069,562 | B2* | 6/2015 | Abadi | G06F 8/38 |
| 9,208,057 | B2* | 12/2015 | Valdiviezo Basauri | G06F 8/41 |
| 9,612,806 | B2* | 4/2017 | Conrad | G06F 8/35 |
| 10,416,970 | B2* | 9/2019 | Takata | G06F 8/42 |
| 10,817,271 | B2* | 10/2020 | Berg | G06F 8/433 |
| 2004/0073889 | A1* | 4/2004 | Baecker | G06F 11/3608 717/121 |
| 2004/0226006 | A1* | 11/2004 | Russell | G06F 30/30 717/154 |
| 2008/0196012 | A1* | 8/2008 | Cohen | G06F 8/75 717/125 |
| 2011/0016457 | A1* | 1/2011 | Artzi | G06F 9/454 717/131 |
| 2012/0331350 | A1* | 12/2012 | Dhoolia | G06F 11/366 714/38.1 |
| 2013/0179863 | A1* | 7/2013 | Vangala | G06F 8/74 717/124 |
| 2015/0186250 | A1* | 7/2015 | Friedler | G06F 11/22 717/124 |
| 2015/0277899 | A1* | 10/2015 | Hamby | G06F 9/4552 717/120 |
| 2018/0121320 | A1* | 5/2018 | Dolby | G06F 11/3608 |

OTHER PUBLICATIONS

Jeremy W. Nimmer et al.; "Static verification of dynamically detected program invariants: Integrating Daikon and ESC/Java"; MIT Lab for Computer Science 200 Technology Square Cambridge, MA—RV 2001 Preliminary Version.*

Ying Jin; "Formal Verification of Protocol Properties of Sequential Java Programs"; 31st Annual International Computer Software and Applications Conference(COMPSAC 2007)—2007 IEEE.*

Lisper, B. et al. "Static Backward Demand-Driven Slicing," *Proceeding PEPM '15 Proceedings of the 2015 Workshop on Partial Evaluation and Program Manipulation*, Jan. 13-14, 2015, Mumbai, India; pp. 115-126.

Matsubara, M. et al. (2012). "Model Checking with Program Slicing Based on Variable Dependence Graphs," *EPTCS* 105, pp. 56-68.

* cited by examiner

METHOD AND SYSTEM FOR VERIFYING PROPERTIES OF SOURCE CODE

PRIORITY CLAIM

This U.S. patent application claims priority under 35 U.S.C§ 119 to: India Application No. 201821021741, filed on Jun. 11, 2018. The entire contents of the aforementioned application are incorporated herein by reference.

TECHNICAL FIELD

The disclosure herein generally relates to software verification, and, more particularly, to method and system for verifying properties of source code.

BACKGROUND

Verification of programs in code-level has attracted many software manufacturers since the cost is too high to extract the models from source code. Conventionally, software manufacturers need increasingly efficient methods and tools to formally verify increased sizes of embedded code associated with large number of properties. Moreover, the function of a computer system is determined by the software that it executes. Behaviors of such an application program expressed by source code means a series of program operation, instructed by a series of instructions described in source code. Properties related to these behaviors includes a property of, if memory is dynamically allocated, reliably releasing the memory, and a property of, if an instruction in a program is executed, reliably executing the corresponding specific instruction sometime. Most of the approaches available for code-level verification are carried by verifying a sufficient subset of properties by identifying implication relations between their verification outcomes. Practically, this approach is expensive and also results into repeated analysis of code common to slices.

In an existing system, the method of automatic verification of properties for a concurrent system performs extraction by translating source strings generated from the source code into strings belonging to a target language, and generating a verification model in the target language. The translation is guided by explicit mappings in a lookup table, optional user-defined data restrictions and default type rules. Standard logic model checking is performed on the extracted verification model to check that the system satisfies (or can possibly violate) any given explicit or implicit logic system property. However, the system limits in grouping of properties belonging to the same group for efficient and scalable verification of properties.

In another existing system, the system defines the requirements for the project based on requirements information captured from a requirements source and for each requirement, associating source code developed for the requirement with the project or assigning the requirement for development of source code. Further the system verifies the defined requirements for the project based on results of one or more of analyses, code coverage measurements, system testing and unit testing performed on the mapped procedures. However, the existing system does not provide a time efficient verification which thereby reduces performance of the source code to be verified.

SUMMARY

Embodiments of the present disclosure present technological improvements as solutions to one or more of the above-mentioned technical problems recognized by the inventors in conventional systems. For example, in one embodiment, a system for verifying properties of source code is provided. The system includes a processor, an Input/output (I/O) interface and a memory coupled to the processor is capable of executing programmed instructions stored in the processor in the memory to pre-process, to receive a source code for verifying properties. The source code comprises annotated with a plurality of properties corresponding to assertions to be grouped, wherein the plurality of properties are defined by a user. The received source code are analyzed to merge the plurality of properties into a plurality of groups based on a grouping technique. Further, the one or more properties are grouped under each group among the plurality of groups wherein the grouping technique comprises one of a slice subsumption (SS) grouping technique, a data flow dependence (DD) grouping technique and a data and control flow dependence (DC) grouping technique, wherein the grouping techniques creates disjoint group. Then, a slice is created for each group among the plurality of groups. Further, each slice created for each group is verified; verification for the one or more properties within each group is performed simultaneously. In another aspect, a method for verifying properties of source code is provided. The method includes a processor, an Input/output (I/O) interface and a memory coupled to the processor is capable of executing programmed instructions stored in the processor in the memory to pre-process, to receive a source code for verifying properties. The source code comprises annotated with a plurality of properties corresponding to assertions to be grouped, wherein the plurality of properties are defined by a user. The received source code are analyzed to merge the plurality of properties into a plurality of groups based on a grouping technique. Further, the one or more properties are grouped under each group among the plurality of groups wherein the grouping technique comprises one of a slice subsumption (SS) grouping technique, a data flow dependence (DD) grouping technique and a data and control flow dependence (DC) grouping technique, wherein the grouping techniques creates disjoint group. Then, a slice is created for each group among the plurality of groups. Further, each slice created for each group is verified; verification for the one or more properties within each group is performed simultaneously.

In yet another aspect, provides one or more non-transitory machine readable information storage mediums comprising one or more instructions, which when executed by one or more hardware processors perform actions including receiving a source code for verifying properties. The source code comprises annotated with a plurality of properties corresponding to assertions to be grouped, wherein the plurality of properties are defined by a user. The received source code are analyzed to merge the plurality of properties into a plurality of groups based on a grouping technique. Further, the one or more properties are grouped under each group among the plurality of groups wherein the grouping technique comprises one of a slice subsumption (SS) grouping technique, a data flow dependence (DD) grouping technique and a data and control flow dependence (DC) grouping technique, wherein the grouping techniques creates disjoint group. Then, a slice is created for each group among the plurality of groups. Further, each slice created for each group is verified; verification for the one or more properties within each group is performed simultaneously. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

The embodiments herein provides a method and system for verifying properties of source code. The properties herein may also be referred as assertion. The proposed method and the system enables the user to verify software code efficiently by grouping related program properties. The method efficiently verifies multiple assertions by avoiding repeated analysis of code required to validate many of those assertions. Verifying groups of related properties improves performance and reduces cost thereby increases scalability when compared to existing verification techniques. The aim of grouping properties is to improve efficiency of verified properties of the source code by avoiding repeated analysis of code segments that are common to the individual slices of those properties. The system also enables for verifying local properties together as group thereby increasing scalability. One or more grouping techniques can be utilized for verifying grouping related properties for the source code over the control and data flow of the input program. The proposed system can also be plugged into any property verification framework for verifying groups of related properties of any software language source code inputted annotated with assertions for grouping. The system provides the user to select at least one grouping technique which further invokes grouping algorithm iteratively until disjoint groups are generated, thereby which performance is improved.

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

Figure 1:
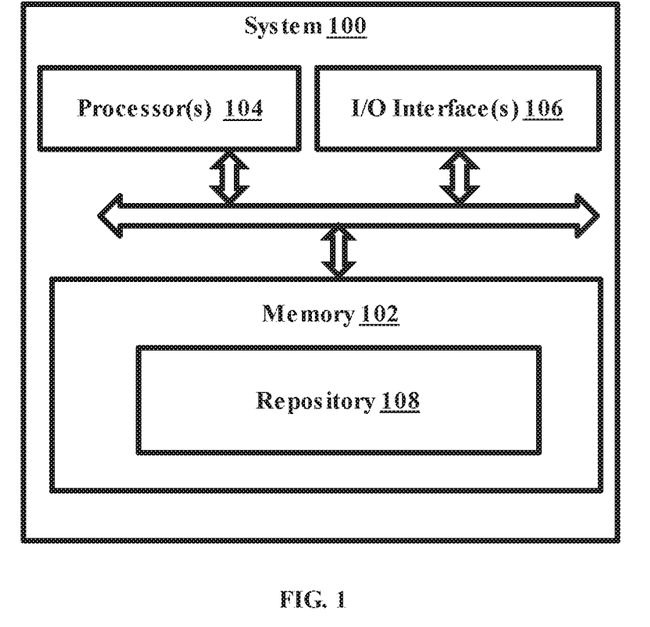
FIG. 1 illustrates an exemplary block diagram of a system for verifying properties of source code, in accordance with some embodiments of the present disclosure.

FIG. 1 illustrates an exemplary block diagram of a system for verifying properties of source code, in accordance with some embodiments of the present disclosure. In an embodiment, the source code verification system 100 includes processor (s) 104, communication interface device(s), alternatively referred as or input/output (I/O) interface(s) 106, and one or more data storage devices or memory 102 operatively coupled to the processor (s) 104. The processor (s) may be alternatively referred as one or more hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server for verifying software code.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102, may include a repository 108. The repository 108 may store the source code received for verification. The memory 102 may further comprise information pertaining to input(s)/output(s) of each step performed by the system 100 and methods of the present disclosure. The system 100 can be configured to receive a plurality of source code annotated with properties and the user selected grouping technique among the grouping techniques.

In an embodiment, the system includes the following modules such as property grouping techniques, a slicer supported with a verification engine. The property grouping techniques may further include the three grouping techniques such as a slice subsumption (SS) technique, a data flow dependence (DD) grouping technique and a data and control flow dependence (DC) grouping technique. The main aim of grouping properties irrespective of their verification outcomes is to improve efficiency by avoiding repeated analysis of code segments that are common to the individual slices of those properties. Let $\psi(g)$ be the slice with respect to the set of properties g. The $\psi(g)$ is generated when decision is made to group all the properties in g. For the given localizer, goal is to reduce the total number of groups or slices so that larger groups of related properties are formed hence a greater number of properties are analyzed together. Each grouping technique may be detailed in conjunction with an example into the following sections.

Figure 2:
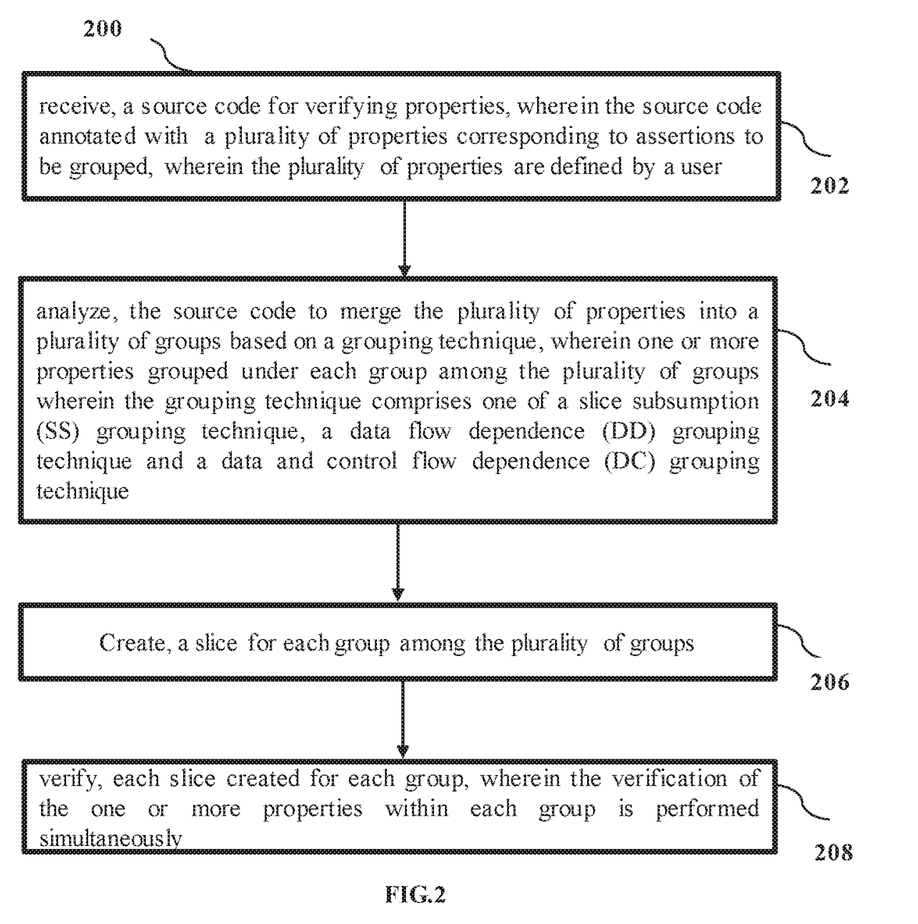
FIG. 2 illustrates a flow diagram for verifying properties of source code, in conjunction with FIG. 4, in accordance with some embodiments of the present disclosure.
Figure 3A:
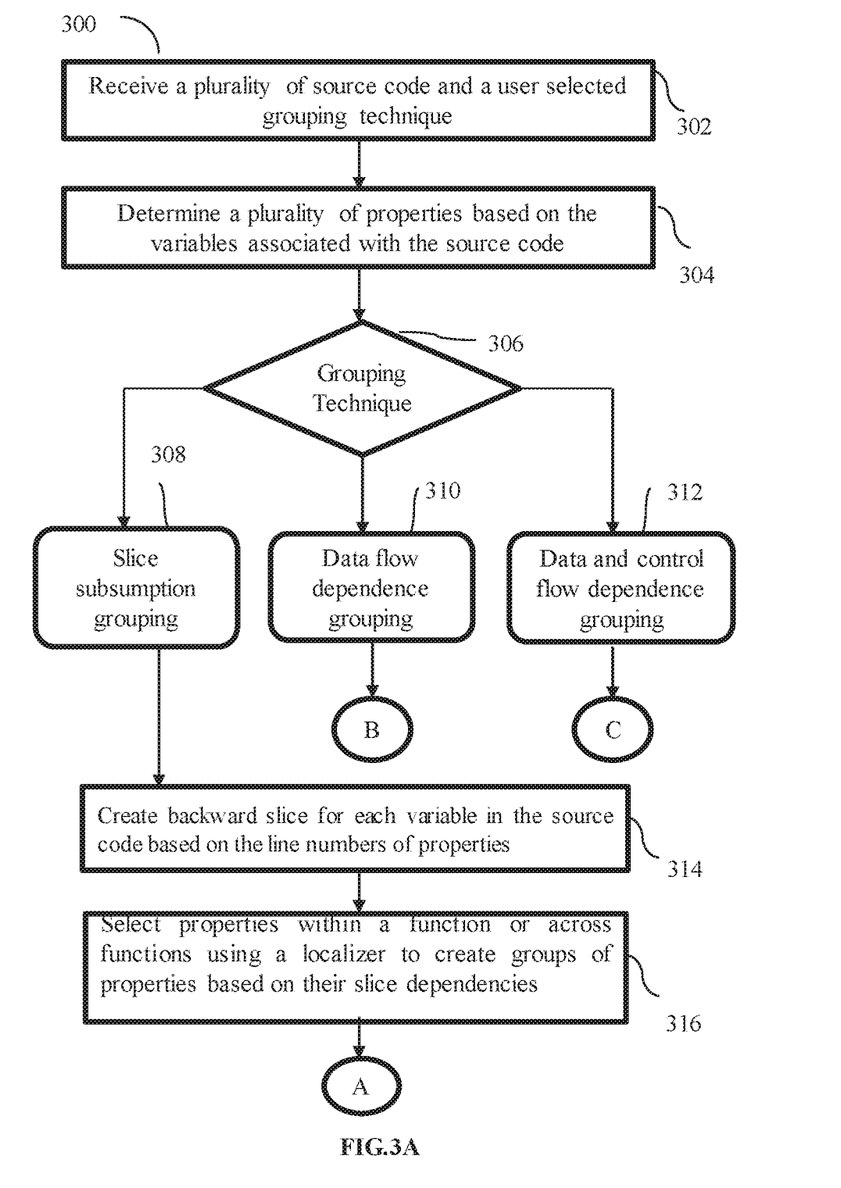
FIGS. 3A, 3B & 3C illustrates an example flow diagram depicting a method with steps utilized in the system for verifying properties of the source code using one of a grouping technique that includes a slice subsumption (SS) grouping technique, a data flow dependence (DD) grouping technique and a data and control flow dependence (DC) grouping technique, in conjunction with FIG. 2 and FIG. 4, in accordance with some embodiments of the present disclosure.
Figure 3B:
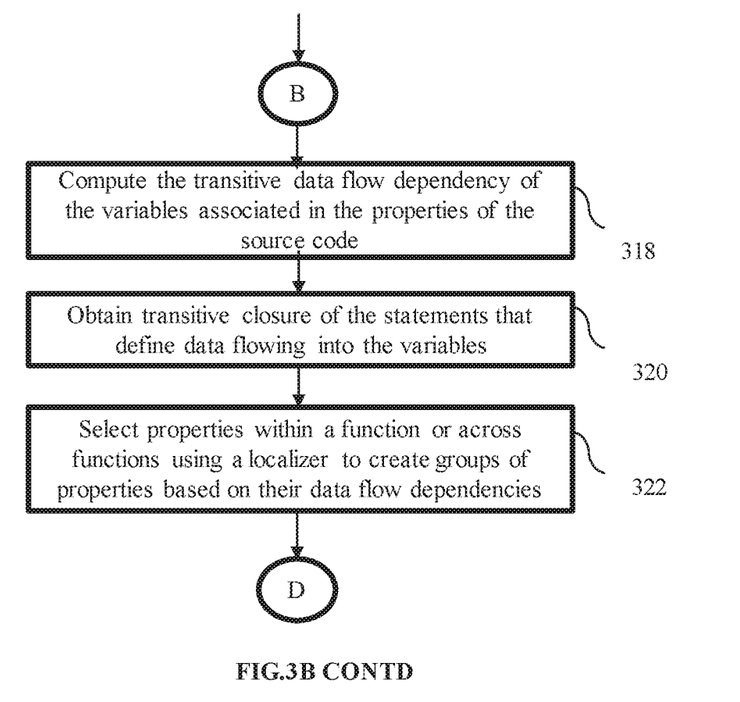
Figure 3C:
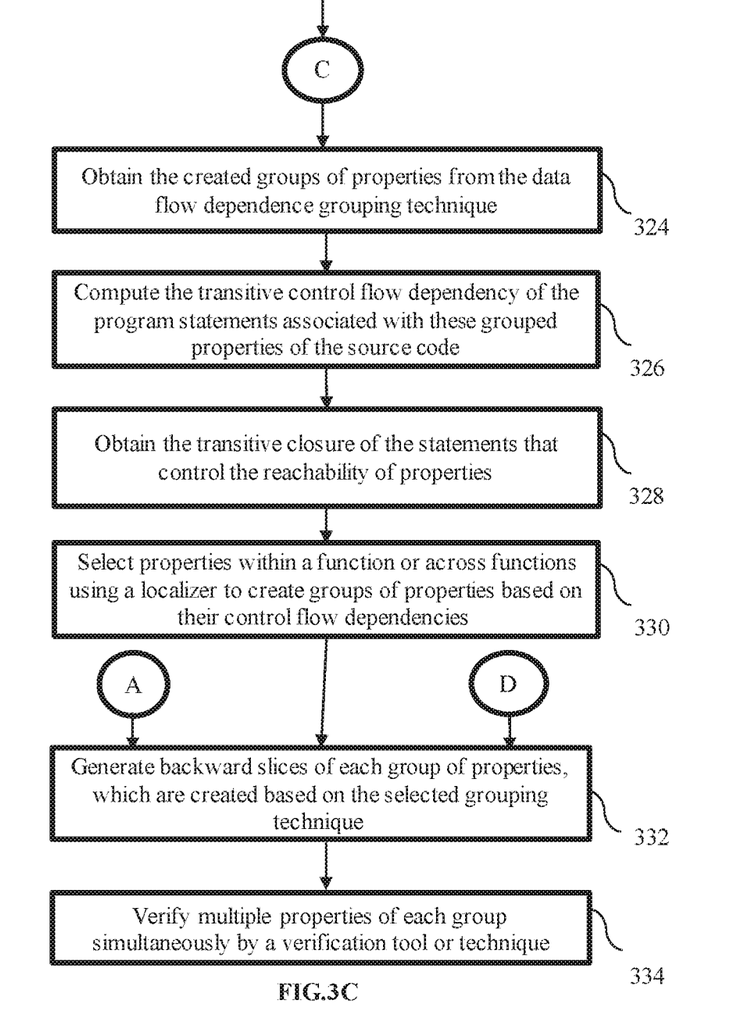
Figure 4:
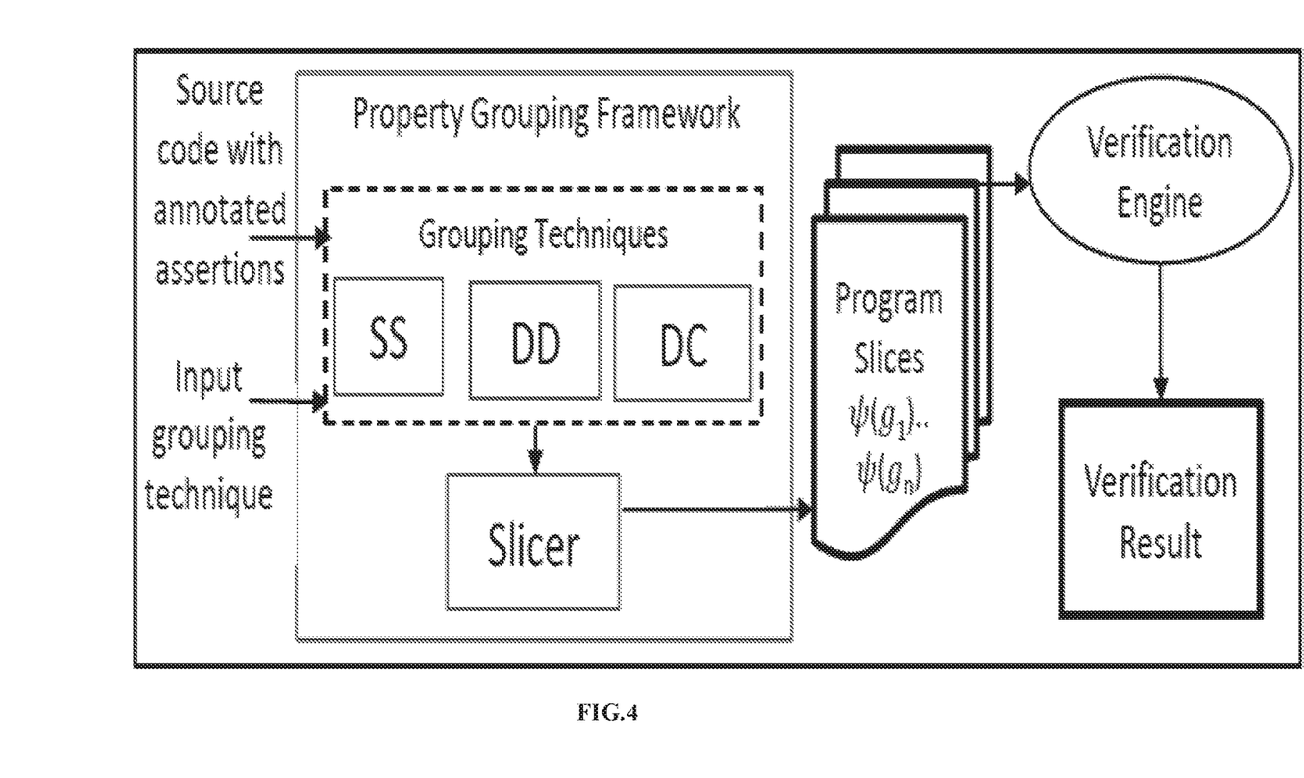
FIG. 4 is a high level architecture for verifying properties of source code, in accordance with some embodiments of the present disclosure.

FIG. 2 illustrates a flow diagram for verifying properties of source code, in conjunction with FIG. 4, in accordance with some embodiments of the present disclosure. The steps of the method 200 of the flow diagram will now be explained with reference to the components or blocks of the system 100 in conjunction with the example architecture of the system as depicted from FIG. 3A, FIG. 3B and FIG. 3C. In an embodiment, the system 100 comprises one or more data storage devices or the memory 102 operatively coupled to the one or more processors 104 and is configured to store instructions for execution of steps of the method 200 by the one or more processors 104. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

At step 202 of the method 200, the processor 104 is configured to receive, a source code for verifying properties, wherein the source code is annotated with a plurality of properties corresponding to assertions to be grouped, wherein the plurality of properties are defined by a user. Considering an example source code of the automotive application received by the processor for verifying properties as mentioned below,

| Line # 1 | ... |
|---|---|
| Line #2 | /* const char *p[6]={...}, a[257]={...}*/ |
| Line #3 | c = 0; |
| Line #4 | d = 0; |
| Line #5 | while (*) { |
| Line #6 | /* P1 */ assert( d<257 ); |
| Line #7 | d++; |
| Line #8 | } |
| Line #9 | while ( p[c] != NULL ) { |
| Line #10 | if ( a[c] != '\0') return; |
| Line #11 | /* P2 */ assert( c<6 ); |
| Line #12 | c++; |
| Line #13 | } |
| Line #14 | /* P3 */ assert( c!=0 ); |
| Line #15 | if (c >= 7) { |
| Line #16 | d = 0; |
| Line #17 | while (a[d] != '\0') { |
| Line #18 | /* P4 */ assert( d<257 ); |
| Line #19 | d++; |
| Line #20 | } |
| Line #21 | } |
| Line #22 | ... |

The source code contains four properties $P_{1-4}$ encoded as assertions which cannot be sliced further with respect to these properties. The validity of all the properties of the source code depends on the constant arrays—p and a, and the input denoted by '*'. In an embodiment, for verifying properties with source code, some existing tools either analyze all given properties together or one property at a time. But analyzing all properties together may not scale over industrial code as mentioned below in Table.1 for the given example source code. Further, analyzing one property at a time leads to a repeated analysis of potentially large or complex parts of code. In the above mentioned source code sample lines 9-13 need to be analyzed for three properties $P_{2-4}$. Other existing techniques relate the verification outcomes of properties investigating if some properties are equivalent or imply each other's validity or invalidity. But such techniques cannot be applied to the code sample because none of its assertions are equivalent nor does the validity (invalidity) of any of its assertions guarantees the validity (invalidity) of others. The only relationship that exists is between assertions $P_2$ and $P_3$—if $P_2$ fails then $P_3$ holds. In general, finding such relationships may need expensive analyses or multiple model checker calls. In the worst case, it may lead to verifying a single property at a time. This is impractical. Considering the backward program slices with respect to individual assertions $P_2$, $P_3$ and $P_4$. The slice with respect to $P_2$ contains instructions at line numbers 2, 3, 9-12, given by $\psi(\{P_2\})=\{2, 3, 9, 10, 12\}$. Similarly $\psi(\{P_3\})=\{2, 3, 9, 10, 12\}$; and $\psi(\{P_4\})=\{2, 3, 9, 10, 12, 15, 16, 17, 19\}$. Thus, the slice with respect to assertion $P_3$ subsumes the slice with respect to $P_2$, and the slice with respect to assertion $P_4$ subsumes the individual slices with respect to $P_2$ and $P_3$ each. Evidently analyzing each of these assertions separately will lead to a repeated analysis of instructions at line numbers 2, 3, 9, 10 and 12 which are common to each slice. But analyzing $P_{2-4}$ together in a single slice will remove this repetition and if the analysis scales, will reduce the overall verification time. On the other hand, it is not practical to group $P_1$ with assertions $P_{2-4}$. Grouping them could lead to a lack of scalability for the assertions that can otherwise be analyzed separately. Here, utilizing existing techniques, experiments were conducted on the above mentioned example source code with different groups of assertions as mentioned below in the Table.1 which represents verifying group of properties where, $P_{i-j}$: Time to validate the properties $P_{i-j}$. $P_{i+j}$: Time to validate $P_i$ then $P_j$. T: Time >120 seconds. Configuration: 2.4 GHz Intel Xeon processor, 20 GB RAM.

TABLE 1

| | Verifying group of properties | | | | | |
|---|---|---|---|---|---|---|
| | Time to Validate (seconds) | | | | | |
| Tool | $P_{1-4}$ | $P_{2-4}$ | $P_2$ | $P_3$ | $P_4$ | $P_2 + P_3 + P_4$ |
| SATABS v 3.2 | T | 20.8 | 55.4 | 7.5 | 12.0 | 74.9 |
| CBMC v 5.8 | T | 7.6 | 7.6 | 7.2 | 7.2 | 22.0 |
| VeriAbs v 1.3.10 | T | 24.4 | 18.4 | 22.0 | 19.0 | 59.4 |
| CPA-Seq v 1.6.1 | T | 11.3 | 14.1 | 10.7 | 102.7 | 127.5 |

Further, the utilization of four well known tools based on a variety of techniques for predicate abstraction based SATABS, bounded model checking based C Bounded Model Checker (CBMC), loop abstraction based VeriAbs, and CPA-Seq based on techniques including interpolation, interval analysis, explicit value analysis, and k-induction. Each tool was most efficient when $P_{2-4}$ grouped together, far superior than verifying each assertion individually were. None of the tools scaled when $P_{1-4}$ were grouped. For example, in case of bounded model checking, $P_1$ could not be analyzed due to the unbounded nature of the loop at line number 5. Thus when grouped with $P_1$, $P_{2-4}$ could not be analyzed either.

In an embodiment the proposed solutions assist in the efficient verification of multiple assertions by avoiding the repeated analysis of code required to validate many of those assertions. These solutions group properties without considering their verification outcomes such as (i) a grouping of properties based on the control and data flow of the program can assist in improving the performance of existing verification techniques and (ii) local properties can be verified together as a group without losing on scalability. A localizer is used to decide which properties should not be grouped to maintain that scalability. The main contributions are: 1. three techniques for grouping related properties using an inexpensive analysis over the control and data flow of the input program. 2. A property grouping framework that allows to plug-in various grouping techniques. 3. An experimental evaluation of (i) the three grouping techniques over six industrial applications and six academic benchmarks, showing that verifying groups of related properties together improves performance, (ii) the most efficient grouping technique over six open source benchmarks against a recent property-outcome dependent solution showcasing grouping to be more efficient.

At step 204, of the method 200, the processor 104 is configured to
analyze, the source code to merge the plurality of properties into a plurality of groups based on a grouping technique, wherein one or more properties grouped under each group among the plurality of groups wherein the grouping technique comprises one of a slice subsumption (SS) grouping technique, a data flow dependence (DD) grouping technique and a data and control flow dependence (DC) grouping technique. The steps of the method 200 of the flow diagram will now be explained with reference to an example architecture of FIGS. 3A, 3B & 3C, in conjunction with FIG. 4, in accordance with some embodiments of the present disclosure. In the slice subsumption grouping technique, initially the system receives a plurality of source code and a user selected grouping technique as depicted in the step 302 of the system 300. Further, for the received source code a plurality of properties are determined based on the variables associated with the source code as depicted in the step 304 of the system 300. Further, the received source code is analyzed and grouped using the slice subsumption (SS) grouping technique as depicted at step 308 for merging the plurality of properties into the plurality of groups. A backward slice for each variable is created in the source code based on the line numbers of properties 14. Further, properties are selected within a function or across functions using a localizer to create groups of properties based on their slice dependencies 16. A backward slice for each property among the plurality of properties of the source code is computed. The backward slice with respect to a set of source code locations is the set of all possible statements of the source code that can affect the values of variables read at the given locations of the source code. Further, the one or more properties are merged, from the plurality of properties, in a single group to create the plurality of groups, wherein the one or more properties in each group are related to each other based on a predefined subset relationship of the backward slices computed for each property. The backward slice of properties for the above mentioned example source code $P_{1-4}$ is: $\psi(\{P_1\})=\{4, 5, 7\}$; $\psi(\{P_2\})=\{2, 3, 9, 10, 12\}$; $\psi(\{P_3\})=\{2, 3, 9, 10, 12\}$; and $\psi(\{P_4\})=\{2, 3, 9, 10, 12, 15, 16, 17, 19\}$. Since $(\{P_2\})\subseteq\psi(\{P_3\})\subseteq(\{P_4\})$, group $P_{2-4}$ by slice subsumption (SS) grouping technique to avoid the repeated analysis of $\psi(\{P_2, P_3\})$. Here, two sets of properties are grouped $g_x$ and $g_y$ if $(g_x)\subseteq(g_y)$ and do not group $P_1$ with $P_{2-4}$ as $\psi(\{P_1\})\not\subseteq\psi(\{P_4\})$. Thus two groups are formed by slice subsumption (SS) grouping technique $\{P_1\}$ and $\{P_2, P_3, P_4\}$.

Now referring to FIG. 3B of the data flow dependence (DD) grouping technique at step 310 of the method 300. Further, for the received plurality of source code and a user selected grouping technique as depicted in the step 302 of the system 300. Further, for the received source code a plurality of properties are determined based on the variables associated with the source code as depicted in the step 304 of the system 300. For the selected data flow dependence (DD) grouping technique 310, it computes the transitive data flow dependency $\phi(g)$ of the variables read in the set of properties g as represented at step 318 of the method 300. Further, the transitive closure of the statements are obtained that define data flowing into the variables at step 320 of the method 300. For this it uses the reaching definition data-flow analysis. Further, properties are selected within a function or across functions using a localizer to create groups of properties based on their data flow dependencies at step 322 of the method 300. In this grouping technique for the received source code is utilized for computing, the transitive data flow dependency for a variable of the source code, wherein the variable is read for a set of properties from the plurality of properties of the source code. Further, the one or more properties are merged, from the plurality of properties, in a single group to create the plurality of groups, wherein the one or more properties in each group are related to each other based on a predefined subset relationship of the computed transitive data flow dependency for each property. The set (g) is the transitive closure of the statements that define data flowing into the variables read in the properties g. Tracking only data flow dependency makes it a lightweight analysis. The data flow dependence information of properties $P_{1-4}$ referring to the above mentioned example source code with the DD grouping technique is represented as $\phi(\{P_1\})=\{4,7\}$; $\phi(\{P_2\})=\{3, 12\}$; $\phi(\{P_3\})=\{3, 12\}$; $\phi(\{P_4\})=\{16, 19\}$. Since $(\{P_2\})\subseteq(\{P_3\})$, properties $P_2$ and $P_3$ are grouped by DD grouping to avoid the repeated analysis of $\phi(\{P_2\})$. This leads to the formation of three groups $\{P_1\}$, $\{P_2, P_3\}$ and $\{P_4\}$. In general, two sets of properties $g_x$ and $g_y$ are grouped by DD grouping if $\phi(g_x)\subseteq(g_y)$.

Now referring to FIG. 3C of the data and control flow dependence (DC) grouping technique at step 312 of the method 300. Furthermore, for the received plurality of source code and a user selected grouping technique as depicted in the step 302 of the system 300. Further, for the received source code a plurality of properties are determined based on the variables associated with the source code as depicted in the step 304 of the system 300. For the selected grouping technique as data and control flow dependence (DC) grouping, the technique obtains the created groups from the data flow dependence grouping technique at step 324 of the method 300. Further, for every group g created by the data flow dependence (DD) grouping technique, the DC grouping technique computes the transitive control dependence $\varphi(g)$ of the properties in g as represented at step 326 of the method 300. In this grouping technique, for the received source code the plurality of groups are identified formed by the data flow dependence (DD) grouping technique. Further, a transitive control flow dependency of the properties is computed for each group formed by the data flow dependence (DD) grouping technique. Further, the one or more properties are merged, from the plurality of properties, in a single group to create the plurality of groups, wherein the one or more properties in each group are related to each other based on a predefined subset relationship of the computed transitive control flow dependency for each properties in each group formed by the data flow dependence (DD) grouping technique. So set (g) is the transitive closure of the statements that control the reachability of the properties in g. The control dependence analysis is performed by computing the strongest post-dominators for the conditions in the control flow graph. As discussed, three groups are formed by Data flow dependence (DD) grouping for the sample code $\{P_1\}$, $\{P_2, P_3\}$ and $\{P_4\}$. The transitive control dependence of these groups $\varphi(g)$ as represented at step 328 of the method 300 is given by $(\{P_1\})=\{5\}$; $(\{P_2, P_3\})=\{9, 10\}$; $\varphi(\{P_4\})=\{9, 10, 15, 17\}$. Since $\varphi(\{P_2, P_3\}) \subseteq \varphi(\{P_4\})$, the DC grouping technique forms two groups $\{P_1\}$ and $\{P_2, P_3, P_4\}$ Further, the technique selects properties within a function or across functions using a localizer to create groups of properties based on their control flow dependencies as represented at step 330 of the method 300. These are identical to the groups formed by the SS grouping technique or method. But this may not be the case in general. The data and control flow dependence (DC) grouping method is more efficient than SS grouping since SS grouping has to track data and control dependence iteratively while forming the dependence graph, whereas data and control flow dependence (DC) grouping performs only Data flow dependence (DD) grouping first and then the control dependence analysis.

At step 206 of the method 200, the processor 104 is configured to create, a slice for each group among the plurality of groups. The proposed system may be plugged in with various grouping techniques and also accepts C source code annotated with the assertions to be grouped. Depending on the grouping technique selected by the user, the system invokes the corresponding grouping algorithm iteratively until the generated groups are disjoint. Finally, it invokes the slicer to generate the slices $\psi(g_1), \psi(g_2) \ldots \psi(g_n)$ corresponding to the groups $g_1, g_2, \ldots g_n$. Slicing is necessary to scale verification in practice. The user can then verify these slices using any verifier capable of checking groups of properties simultaneously.

At step 208 of the method 200, the processor 104 is configured to verify each slice created for each group, wherein the verification of the one or more properties within each group is performed simultaneously. Further, this step can be elaborated with respect to step 334 of the method 300 where the experimental analysis is verified using one of the grouping techniques by performing experiments on six industrial embedded applications and six open source benchmarks. For the experimental analysis 1 to evaluate the gain in efficiency by conducting two sets of experiments. In the first set, experiments were performed on well-known benchmarks that have been encoded with 875 assertions that shows an improvement in the efficiency of FunFrog tool in the presence of multiple assertions. The experiments were also performed with respect to four well known tools present in the state of the art such as CBMC 5.8, CPA-Seq 1.6.1, VeriAbs 1.3.10 and Ultimate Automizer 0.1.23-3204b741. The Ultimate Automizer uses techniques like CEGAR, predicate abstraction and lazy abstraction. The above mentioned tools can verify multiple assertions in one call. CPA-Seq and Ultimate Automizer exit when they find an invalid assertion that has to be called multiple times with each failing assertion. The comparative experimental analysis is performed over well-known benchmarks for evaluating gain in efficiency using known in the art approaches with the disclosed proposed system as described below in Table 2. Last three columns of this table shows comparison of most efficient grouping technique, DC grouping, against recent technique, detecting assertion implications (DAI).

TABLE 2

Evaluation of gain in efficiency and comparison with DAI

| | | | SS | | DD | | DC | | CBMC | | CPA-Seq | | VeriAbs | | UAuto. | | FunFrog | | |
| --- | --- | --- | --- | --- | --- | --- | --- | --- | --- | --- | --- | --- | --- | --- | --- | --- | --- | --- | --- |
| Program | KLOC | #Pr. | (s) | #g | (s) | #g | (s) | #g | − | + | − | + | − | + | − | + | DAI | DAI | DC |
| Tokenring | 2.27 | 108 | 25 | 2 | 13.1 | 5 | 12.3 | 1 | 1.2 | 0.9 | 662 | 271.7 | 14 | 9 | T | 6160 | 36.5 | 312.4 | 73.1 |
| Memslave | 1.18 | 146 | 15 | 2 | 13.7 | 2 | 12.2 | 2 | 1.1 | 0.8 | 352 | 259.8 | 15 | 20.5 | 14475 | 3975 | 24.6 | 70.9 | 15.6 |
| ddv | 5.41 | 152 | 22.3 | 1 | 17.4 | 3 | 16.2 | 1 | 7 | 0.5 | 24 | 27.8 | 30 | 24.5 | 320 | 67.2 | 14.9 | 162.1 | 3.2 |
| diskperf | 4.93 | 192 | 18 | 1 | 24 | 3 | 15.1 | 1 | 15 | 4.9 | 450 | 260.9 | 31 | 25.5 | 949 | 467.2 | 75.8 | 65.5 | 379 |
| s3 | 1.78 | 131 | 17 | 3 | 14 | 5 | 12.7 | 3 | 3.8 | 1.8 | 488 | 275.3 | 22 | 38.3 | E | E | 4.4 | 20.6 | 12.7 |
| cafe | 16.64 | 146 | 21 | 1 | 34 | 3 | 20.0 | 1 | T | 2.1 | 786 | 324 | 39 | 33 | 410 | 404 | 42.2 | 216.3 | 20 |
| Total | 32.21 | 875 | 118.3 | 10 | 116.2 | 21 | 88.5 | 9 | 428 | 11 | 2762 | 1420 | 151 | 150.8 | 16477 | 11073 | 198.4 | 847.8 | 503.6 |

(s): seconds. Here, all timings are in seconds and Application sizes in KLOC: Kilo Lines of Code. #Pr.: Number of Properties. #g: Number of groups. '−': Tool execution time over all properties. '+': Tool execution time over DC groups. E: Tool Error. Configuration: 2.4 GHz Intel Xeon processor, 20 GB RAM, Fedora Core Operating System. T: Timeout after 400 s.

In another embodiment, the data and control flow dependence (DC) grouping technique shows to be the fastest and faster than Data flow dependence (DD) grouping technique as it forms the least number of groups. The groups generated by DC grouping were used as input to the test tools. The results show that the total time required by all tools are reduced by up to 92% due to grouping of related properties of the source code. The reduction was the least for VeriAbs—0.13%. Overall this data indicates that before grouping the verification tools spent up to 92% of their time analyzing repeated code fragments. This repetition was greatly reduced by grouping. However, a significant amount of time was spent in grouping properties as compared to the verification time. This was attributed to the simplicity of the input benchmarks. So the input tools could verify them quickly.

In the next set of experiments, applying grouping techniques into six industrial applications with respect to an advanced verification tool, wherein the verification tool may be ELABMC. The verification tool has been shown to verify large embedded applications with better scalability and precision than some state-of-the-art tools. It uses abstractions to assist the scalability of Bounded Model Checking (BMC). The performance of this tool has been compared before and after applying the grouping techniques to six embedded applications $A_1$-$A_6$. Application $A_1$ implements a smart-card functionality, and applications $A_2$-$A_6$ implement a module of a protocol stack, CAN driver, breaking controller, battery controller and an infotainment system of a vehicle, respectively. The verification tool annotates the input code with assertions, abstracts it, and then applies BMC to the abstractions one property at a time. The grouping framework was invoked after the annotation phase of the verification tool and executed CBMC in the all-claims mode to ensure that multiple properties were verified in a single SAT call. The applications were evaluated for invalid array indexing, division by zero, data type overflows and underflows using the SS, DD and DC grouping techniques against no grouping. The results are shown in Table 3 represents experimental for evaluating the gain in efficiency of verification tool by grouping.

TABLE 3

Evaluating gain in efficiency of ELABMC

| Ap. | KLOC | #Pr. | Time to slice (w/o grouping) (min.) | Time to Group and Slice (minutes) | | | # Groups | | | Total Execution Time (Hours) | | | |
|---|---|---|---|---|---|---|---|---|---|---|---|---|---|
| | | | | SS | DD | DC | SS | DD | DC | w/o Grouping | With grouping | | |
| | | | | | | | | | | | SS | DD | DC |
| A1 | 7.7 | 196 | 0.5 | 4.2 | 0.8 | 1.4 | 45 | 89 | 47 | 3.7 | 1.2 | 1.5 | 1.2 |
| A2 | 8.0 | 94 | 0.5 | 2.4 | 0.6 | 0.6 | 19 | 41 | 19 | 1.3 | 0.4 | 0.7 | 0.3 |
| A3 | 18.3 | 226 | 4.5 | 10.4 | 2.4 | 2.4 | 61 | 91 | 63 | 3.9 | 1.3 | 1.6 | 1.2 |
| A4 | 34.0 | 346 | 8.9 | 11.0 | 3.0 | 3.8 | 71 | 84 | 75 | 9.9 | 2.3 | 2.7 | 2.2 |
| A5 | 60.0 | 189 | 18.0 | 122.0 | 16.7 | 11.7 | 87 | 100 | 89 | 5.9 | 4.0 | 3.8 | 2.1 |
| A6 | 119.0 | 351 | 40.0 | 200.0 | 23.8 | 20.4 | 144 | 226 | 150 | 29.2 | 15.2 | 22.0 | 11.6 |
| Total | 247.0 | 1402 | 72.4 | 350.0 | 47.3 | 40.3 | 427 | 631 | 443 | 53.8 | 20.8 | 29.6 | 16.3 |

Values are rounded off. Total execution timings include the time to group. Application sizes in Kilo Lines of Code (KLOC). Machine Configuration: 2.10 GHz Intel i5 processor, 8 GB RAM, 64 bit Windows Operating System. Ap.: Application. #Pr.: Number of properties. W/o: without.

The total time required by the verification tool to verify these applications reduced by at least 45% and up to approximately 70%. This data indicates that before grouping the verification tool spent up to 70% of its time analyzing repeated code fragments. This repetition was greatly reduced by grouping. Similar to the last experiment, cumulatively DC grouping was the fastest due to its efficient grouping algorithm in spite of SS grouping forming the least number of groups. Also the number of properties verified with and without (w/o) grouping remained the same showing no loss in the precision of the verification tool due to a lack of scalability after grouping. Finally, note that the time to group properties is much less significant as compared to the verification time. This was attributed to the high complexity of these applications. The verification tool spent more time analyzing properties than grouping.

In an embodiment, describing the experimental analysis 2 is a comparison with an existing technique by performing this experiment to validate that grouping properties with respect to the control and data flow characteristics of the input program can be more efficient than checking implication relations between the properties. The most efficient of the three grouping techniques, DC grouping is evaluated against a recent technique called detecting assertion implications (DAI). DAI improved the performance of the interpolation based tool, FunFrog, in the presence of many assertions. It reduces the number of assertions to be verified by finding implication relations between them. It has been implemented as a preprocessor to FunFrog and evaluated on well-known verification benchmarks. This comparison attempted to improve the efficiency of FunFrog with DC grouping on the same benchmarks. FunFrog can simultaneously analyze a group of properties encoded in the input program. The last three columns of Table.2 show the details of this experiment. As can be seen, DC+FunFrog has taken approximately 54.5% lesser time than DAI+FunFrog. Also the overall DC grouping time is lesser than DAI by 44%. This clearly highlights the advantage of grouping based on lightweight static analysis.

FIG. 4 is a high level architecture for verifying properties of source code, in accordance with some embodiments of the present disclosure. Embodiments herein provide a method and system for verifying properties of source code associated with any software application. Initially, the system receives a plurality of source codes and a user selected grouping technique for processing. Further, a plurality of properties are determined based on the variables associated with the source code. The user can select a grouping technique among the grouping techniques such as a slice subsumption grouping technique, a data flow dependence grouping technique and a data and control flow dependence grouping technique. If the user selected grouping technique is slice subsumption grouping technique then sequentially the system performs the following steps, creating backward slices with respect to variables read in the properties at given line numbers and the properties within a function or across functions are classified using a localizer to create groups of properties based on the slices.

Further, if the user selected grouping technique is data flow dependence grouping technique then sequentially the system performs the following steps, the transitive data flow dependency is computed for the variables associated in the property of the source code. The transitive closure of the statements are obtained that define data flowing into the variables and the properties within a function or across functions are classified using a localizer to create groups of properties based on their data flow dependencies. Furthermore, if the user selected grouping technique is data and control flow dependence grouping technique then sequentially the system performs the following steps, the groups of properties created from the data flow dependence grouping technique are obtained. The transitive control flow dependency of the program statements associated with these grouped properties of the source code is computed. The transitive closure of the statements are obtained that control the reachability of these properties and then these properties within a function or across functions may be classified using a localizer to create groups of properties based on their control flow dependencies. The processed data obtained from the grouping techniques such as a slice subsumption grouping technique, a data flow dependence grouping technique and a data and control flow dependence grouping technique are provided to generate backward slices of each group of properties based on the selected grouping technique. The multiple properties of each group can be verified simultaneously.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of verifying properties of source code. The embodiment, thus provides a method for creating disjoint group of properties verifiable one group at a time which is efficient, automatic and scalable verification for numerous properties of real world software systems. Moreover, the embodiments herein further enables the system to be plugged in with various grouping techniques for verifying source code. The proposed method experimentally shows improved performance thereby reducing the cost in comparison with existing techniques known in the state of the art. The system also enables to verify local properties together as a group which increases scalability of the properties to be verified. The system provides one or more grouping techniques for which the source code is verifiable improving efficiency by avoiding repeated analysis of code segments that are common to the individual slices of those properties.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

We claim:

1. A processor implemented method for verifying properties of source code, wherein the method comprises:
   receiving, by the processor, a source code for verifying properties, wherein the source code is annotated with a plurality of properties corresponding to assertions to be grouped, wherein the plurality of properties are defined by a user;
   analyzing, by the processor, the source code to merge the plurality of properties into a plurality of groups based on a grouping technique, wherein the one or more properties grouped under each group among the plurality of groups are selected within a function or a plurality of functions using a localizer, and wherein, the grouping technique comprises one of a slice subsumption (SS) grouping technique, a data flow dependence (DD) grouping technique and a data and control flow dependence (DC) grouping technique, wherein, the grouping techniques is iteratively performed until disjoint groups are created;
   creating, by the processor, a slice for each group among the plurality of groups; and
   verifying, by the processor, each slice created for each group, wherein the verification of the one or more properties within each group is performed simultaneously.

2. The method as claimed in claim 1, wherein the slice subsumption (SS) grouping technique comprises:
   computing, a backward slice for each property among the plurality of properties of the source code, wherein the backward slice with respect to a set of source code locations is the set of all possible statements of the source code that can affect the values of variables read at the given locations of the source code; and merging one or more properties, from the plurality of properties, in a single group to create the plurality of groups, wherein the one or more properties in each group are related to each other based on a predefined subset relationship of the backward slices computed for each property.

3. The method as claimed in claim 1, wherein the data flow dependence (DD) grouping technique comprises:

computing, a transitive data flow dependency for a variable of the source code, wherein the variable is read for a set of properties from the plurality of properties of the source code; and merging one or more properties, from the plurality of properties, in a single group to create the plurality of groups, wherein the one or more properties in each group are related to each other based on a predefined subset relationship of the computed transitive data flow dependency for each property.

4. The method as claimed in claim 1, wherein the data and control flow dependence (DC) grouping technique comprises:

identifying the plurality of groups formed by the data flow dependence (DD) grouping technique;

computing, a transitive control flow dependency of the properties in each group formed by the data flow dependence (DD) grouping technique; and merging one or more properties, from the plurality of properties, in a single group to create the plurality of groups, wherein the one or more properties in each group are related to each other based on a predefined subset relationship of the computed transitive control flow dependency for each properties in each group formed by the data flow dependence (DD) grouping technique.

5. A system for verifying properties of source code, wherein the system comprises:

a memory storing instructions;

one or more Input/output (I/O) interfaces;

and one or more processors coupled to the memory via the one or more I/O interfaces, wherein the processor is configured by the instructions to:

receive, a source code for verifying properties, wherein the source code is annotated with a plurality of properties corresponding to assertions to be grouped, wherein the plurality of properties are defined by a user;

analyze, the source code to merge the plurality of properties into a plurality of groups based on a grouping technique, wherein the one or more properties grouped under each group among the plurality of groups are selected within a function or a plurality of functions using a localizer, wherein the grouping technique comprises one of a slice subsumption (SS) grouping technique, a data flow dependence (DD) grouping technique and a data and control flow dependence (DC) grouping technique, wherein the grouping techniques creates disjoint group;

create, a slice for each group among the plurality of groups; and verify, each slice created for each group, wherein the verification of the one or more properties within each group is performed simultaneously.

6. The system as claimed in claim 5, wherein the slice subsumption (SS) grouping technique comprises:

computing, a backward slice for each property among the plurality of properties of the source code, wherein the backward slice with respect to a set of source code locations is the set of all possible statements of the source code that can affect the values of variables read at the given locations of the source code; and merging one or more properties, from the plurality of properties, in a single group to create the plurality of groups, wherein the one or more properties in each group are related to each other based on a predefined subset relationship of the backward slices computed for each property.

7. The system as claimed in claim 5, wherein the data flow dependence (DD) grouping technique comprises:

computing, a transitive data flow dependency for a variable of the source code, wherein the variable is read for a set of properties from the plurality of properties of the source code; and merging one or more properties, from the plurality of properties, in a single group to create the plurality of groups, wherein the one or more properties in each group are related to each other based on a predefined subset relationship of the computed transitive data flow dependency for each property.

8. The system as claimed in claim 5, wherein the data and control flow dependence (DC) grouping technique comprises:

identifying the plurality of groups formed by the data flow dependence (DD) grouping technique;

computing, a transitive control flow dependency of the properties in each group formed by the data flow dependence (DD) grouping technique; and merging one or more properties, from the plurality of properties, in a single group to create the plurality of groups, wherein the one or more properties in each group are related to each other based on a predefined subset relationship of the computed transitive control flow dependency for each properties in each group formed by the data flow dependence (DD) grouping technique.

9. One or more non-transitory machine readable information storage mediums comprising one or more instructions which when executed by one or more hardware processors perform actions comprising:

receiving, by the processor, a source code for verifying properties, wherein the source is code annotated with a plurality of properties corresponding to assertions to be grouped, wherein the plurality of properties are defined by a user;

analyzing, by the processor, the source code to merge the plurality of properties into a plurality of groups based on a grouping technique, wherein the one or more properties grouped under each group among the plurality of groups are selected within a function or across a plurality of functions using a localizer, wherein the grouping technique comprises one of a slice subsumption (SS) grouping technique, a data flow dependence (DD) grouping technique and a data and control flow dependence (DC) grouping technique, wherein the grouping techniques creates disjoint group;

creating, by the processor, a slice for each group among the plurality of groups; and verifying, by the processor, each slice created for each group, wherein the verification of the one or more properties within each group is performed simultaneously.

10. The one or more non-transitory machine readable information storage mediums of claim 9, wherein the slice subsumption (SS) grouping technique comprises:
  computing, a backward slice for each property among the plurality of properties of the source code, wherein the backward slice with respect to a set of source code locations is the set of all possible statements of the source code that can affect the values of variables read at the given locations of the source code; and
  merging one or more properties, from the plurality of properties, in a single group to create the plurality of groups, wherein the one or more properties in each group are related to each other based on a predefined subset relationship of the backward slices computed for each property.

11. The one or more non-transitory machine readable information storage mediums of claim 9, wherein the data flow dependence (DD) grouping technique comprises:
  computing, a transitive data flow dependency for a variable of the source code, wherein the variable is read for a set of properties from the plurality of properties of the source code; and
  merging one or more properties, from the plurality of properties, in a single group to create the plurality of groups, wherein the one or more properties in each group are related to each other based on a predefined subset relationship of the computed transitive data flow dependency for each property.

12. The one or more non-transitory machine readable information storage mediums of claim 9, wherein the data and control flow dependence (DC) grouping technique comprises:
  identifying the plurality of groups formed by the data flow dependence (DD) grouping technique;
  computing, a transitive control flow dependency of the properties in each group formed by the data flow dependence (DD) grouping technique; and
  merging one or more properties, from the plurality of properties, in a single group to create the plurality of groups, wherein the one or more properties in each group are related to each other based on a predefined subset relationship of the computed transitive control flow dependency for each properties in each group formed by the data flow dependence (DD) grouping technique.

* * * * *